US008803860B2

(12) United States Patent
Jamal

(10) Patent No.: US 8,803,860 B2
(45) Date of Patent: Aug. 12, 2014

(54) GATE DRIVER FALL TIME COMPENSATION

(75) Inventor: Shafiq M. Jamal, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 13/604,580

(22) Filed: Sep. 5, 2012

(65) Prior Publication Data

US 2013/0328839 A1 Dec. 12, 2013

Related U.S. Application Data

(60) Provisional application No. 61/657,561, filed on Jun. 8, 2012.

(51) Int. Cl.
*G06F 3/038* (2013.01)

(52) U.S. Cl.
USPC .............................. 345/204; 345/211; 349/90

(58) Field of Classification Search
CPC .................... G09G 3/3655; G09G 2320/0247; G09G 2300/043; G09G 2320/0219; G06F 3/038
USPC ......... 345/204–205, 211–215, 50–55, 87–94; 349/90–93
See application file for complete search history.

(56) References Cited

U.S. PATENT DOCUMENTS 4,127,848 A * 11/1978 Shanks ........................... 345/87
6,392,629 B1 5/2002 Murakami et al.
7,362,296 B2 4/2008 Song et al.
7,551,171 B2 * 6/2009 Kimura et al. ................ 345/211
7,834,837 B2 11/2010 Syu et al.
7,903,105 B1 * 3/2011 Lan et al. ...................... 345/204
8,169,392 B2 * 5/2012 Feng ............................... 345/94
8,599,123 B2 * 12/2013 Guo et al. ....................... 345/94
2002/0126071 A1 * 9/2002 Kojima et al. .................. 345/60
2003/0234758 A1 * 12/2003 Bu et al. .......................... 345/90
2009/0167739 A1 * 7/2009 Tsubata ......................... 345/208
2010/0315322 A1 * 12/2010 Cheng et al. ..................... 345/99
2011/0148954 A1 * 6/2011 Tobita et al. .................. 345/698
2011/0221713 A1 * 9/2011 Omoto .......................... 345/204
2012/0001877 A1 * 1/2012 Yanagi et al. ................. 345/204
2012/0206324 A1 * 8/2012 Yamashita et al. .............. 345/80
2013/0088470 A1 * 4/2013 Chang et al. .................. 345/208

* cited by examiner

*Primary Examiner* — Amare Mengistu
*Assistant Examiner* — Vinh Lam
(74) *Attorney, Agent, or Firm* — Blakely, Sokoloff, Taylor & Zafman LLP

(57) ABSTRACT

A display system includes a display panel of pixels, a gate driver and a compensation unit. The gate driver receives a control signal and based on the control signal, generates a gate signal to drive a transistor included in a pixel. The compensation unit measures and compensates for a fall time of the gate driver. The compensation unit includes a replica gate driver, a peak RMS detector, a comparator and a counter. The replica gate driver generates a replica gate signal based on the control signal. The peak RMS detector calculates a peak RMS of the replica gate signal. The comparator compares the peak RMS of the replica gate signal and a reference voltage and generates a comparator value. The counter is controlled by the comparator value to generate a compensation value used to adjust the gate driver and the replica gate driver. Other embodiments are also described and claimed.

20 Claims, 9 Drawing Sheets

GATE DRIVER FALL TIME COMPENSATION

CROSS-REFERENCE TO RELATED APPLICATIONS

This application claims the benefit pursuant to 35 U.S.C. 119(e) of U.S. Provisional Application No. 61/657,561, filed Jun. 8, 2012, which application is specifically incorporated herein, in its entirety, by reference.

FIELD

An embodiment of the invention generally relates to electronic display devices and, more particularly, to compensate a gate driver of an active matrix thin film transistor (TFT) flat panel display. Other embodiments are also described.

BACKGROUND

For many applications, and particularly in consumer electronic devices, the relatively large and heavy cathode ray tube (CRT) has been replaced by flat panel display types such as liquid crystal display (LCD), plasma, electroluminescent and organic light emitting diode (OLED). Flat panel displays are typically used as video screens for a variety of consumer electronics devices, such as televisions, desktop computers and mobile or portable devices such as smart phones, digital audio and video players, video game handsets, and tablet computers. In addition to having a relatively thin profile, flat panel devices typically use less power than the CRT and are also much lighter. The flat panel display contains thousands or millions of display elements or pixels that are formed on a transparent substrate (e.g., glass), where each display element receives a data value or a signal that represents a digital picture element that is to be displayed at that location. With active matrix devices, the signal is applied using a transistor (that may be deemed part of the pixel or display element) that has been formed on the transparent substrate. These are sometimes referred to as thin film transistors (TFTs). The transistor may be driven to act as a switch element, with one carrier electrode that receives the data value, another carrier electrode that applies the data value to the pixel, and a control electrode that receives a gate or scanning signal. The gate signal may serve to modulate, typically turn on and turn off, the transistor so as to write and then store the data value into the pixel.

The array of pixels is overlaid with a grid of conductive data lines and gate lines. The data lines serve to deliver the data values to the carrier electrodes of the transistors, while the gate lines serve to apply the gate signals to the control electrodes of the transistors. In other words, each of the data lines is coupled to a respective group of pixels, typically referred to as a column, while each of the gate lines is coupled to a respective row of pixels. Each data line is coupled to a data line driver circuit that receives control and data values in digital form, from decode and timing logic that may be part of a display driver or controller-integrated circuit. The latter has translated incoming video information from another processor, including digitized pixel values, for example red, green and blue digital pixel values, into data signals having the appropriate timing and voltage and current levels. The pixel array is driven in a row-by-row or scanning line manner, where gate lines are sequentially pulsed, while during assertion of the pulse the desired pixel values are written into each selected row of pixels.

For a given pixel, the amount of light that can be viewed by the user at that point depends on the data value that has been written. Typically, a data line voltage is written as an analog pixel voltage that may be stored by a small capacitor in the pixel. In a TFT active matrix LCD pixel, the data line voltage is applied to a liquid crystal capacitor, to develop a voltage difference between a pixel electrode and a common electrode of the capacitor. This pixel voltage aligns the liquid crystal molecules that are between those electrodes in a predefined way so that light transmission is modulated at that point appropriately. This is also referred to as setting an analog voltage that represents the data value (typically, a digital gray level between white and black), into the pixel.

However, when the gate signal turns off the transistor, the fall time (pulse decay time) of the gate signal may couple onto the capacitor in the pixel. This coupling may cause a slight bump in the voltage across the transistor or cause a charge ejection from the transistor. Accordingly, as the gate signal swings downwards to turn off the transistor, coupling due to parasitic elements (e.g., a parasitic capacitor across the transistor) may occur that affect the voltage being stored in capacitor. Thus, the data line voltage being stored in the capacitor in the pixel may not be accurate because of this coupling.

One way to overcome this effect of the coupling is to reduce the fall time to an optimal fall time that is determined and set in the factory. But, one issue with this solution is that the voltage threshold of the transistor and the gate driver may shift which will cause the fall time of the gate driver to shift as well.

SUMMARY

An embodiment of the invention is a display system having a display panel including a pixel that has a respective switch circuit (e.g., a single TFT) and a charge storage circuit (e.g., a single liquid crystal capacitor) that may be formed on a transparent substrate (e.g., a glass panel). The display system may also include a gate driver that receives a control signal and generates, based on the control signal, a gate signal to drive the transistor in the pixel. In order to compensate for the fall time of the gate driver, the display system further includes a compensation unit that is coupled to the gate driver. The compensation unit includes a replica gate driver, an AC coupler, a peak RMS detector, a comparator, and a counter. The replica gate driver is a replica of the gate driver and also receives the control signal. The replica gate driver generates a replica gate signal based on the control signal. The AC coupler may be coupled to the output of the replica gate signal to perform AC coupling on the replica gate signal. The peak RMS detector may be coupled to the AC coupler to calculate a peak RMS of the AC coupled replica gate signal and to output the peak RMS. The comparator may be coupled to the peak RMS detector to compare the peak RMS and a reference voltage and to output a comparator value. The reference voltage may be an optimal voltage determined in the factory. The counter that is controlled by the comparator value generates a compensation value that is used to adjust both the gate driver and the replica gate driver in order to compensate for the fall time. In one embodiment, an offset value may be added to the compensation value to generate an offset compensation value used to adjust the gate driver. The compensation unit may also have a look-up table coupled to the counter to generate an actual fall time used to adjust the gate driver and the replica gate driver.

Another embodiment of the invention is a method of compensating a fall time of a gate driver in a display system. The display system may include a display panel, the gate driver, and a compensation unit. The method starts with both the gate driver and a replica gate driver included in the compensation unit receiving a control signal. Based on the control signal, a gate signal and a replica gate signal are generated by the gate driver and the replica gate driver, respectively. Next, an AC coupler included in the compensation unit may perform AC coupling on the replica gate signal and output an AC coupled replica gate signal to a peak RMS detector. The compensation unit may also include this peak RMS detector. A peak RMS of the AC coupled replica gate signal is then calculated and outputted by the peak RMS detector. Next, an analog comparator may receive the peak RMS being outputted from the peak RMS detector and a reference voltage $V_x$. The comparator senses the difference between the peak RMS and the reference voltage $V_x$ and outputs a comparator value. A counter logic that is controlled by the comparator value may then generate a digital output count that is a compensation value used to adjust the gate driver and the replica gate driver.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

As discussed below, the present disclosure relates generally to display systems including compensation unit to generate a compensation value used to adjust the gate driver and compensate for the fall time of the gate driver. With this in mind, and referring now to FIG. 1, a combined circuit schematic and block diagram of an example display system or display device, in accordance with an embodiment of the invention is shown. The system 1 has an array of display elements or pixels that form an image viewable region of a screen, for instance. Each individual pixel may include a transistor 3, e.g. a thin film transistor (TFT), that will be operated partly as a switch, to selectively apply (turn on and turn off) a data line signal that is received on one of its carrier electrodes, on to a plate of a capacitor 4 that is connected to its other carrier electrode.

Figure 1:
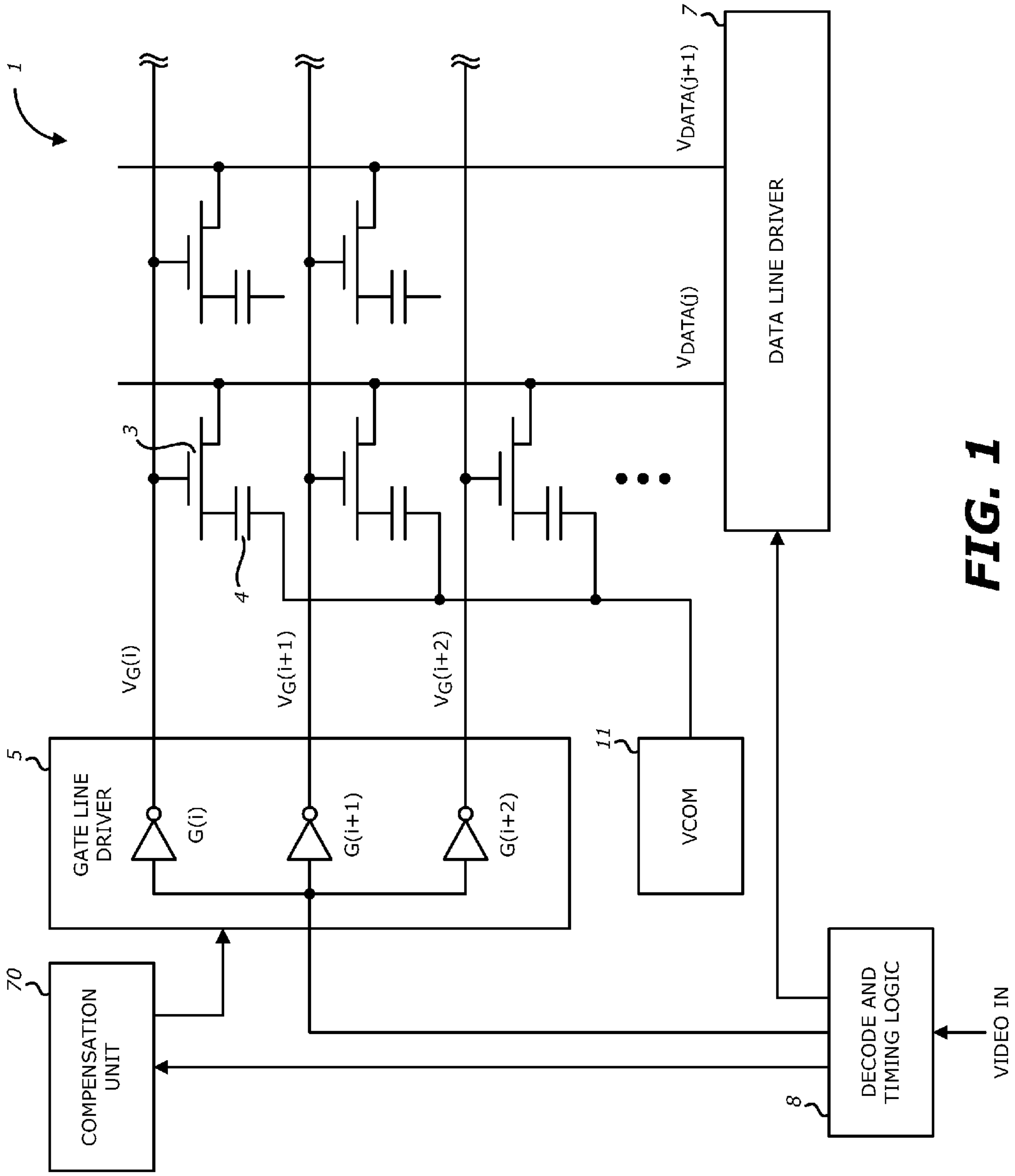
FIG. 1 is a combined circuit schematic and block diagram of part of a display system, in accordance with one embodiment of the invention.

In this case, each transistor 3 of the respective pixel has its carrier electrode directly connected to a respective gate line that is driven by a voltage source $V_G$, and these voltage sources can be found within gate line driver circuitry 5. As illustrated in FIG. 1, the gate line driver circuitry 5 may include a plurality of gate drivers G(i) (i>1). Each of the gate drivers G(i) receives a control signal from a decode and timing logic 8. In accordance with the control signal, each gate driver G(i) generates a gate signal to drive the transistor 3 in the pixel that is coupled thereto. Ideally, the gate signal may be a pulse with an amplitude of $V_G$. The gate signal may serve to modulate, typically turn on and turn off, the transistor 3 so as to write and then store the data value into the pixel. As discussed above, when the gate signal turns off the transistor 3, the fall time of the gate signal may couple onto the capacitor 4 in the pixel. As shown in FIG. 1, a compensation unit 70 that also receives the control data from the timing and decode logic 8 is further coupled to the gate line driver circuitry 5. The compensation unit 70 generates a compensation value that is used to adjust the gate line driver circuitry 5 in order to compensate for the fall time. Thus, the arrangement depicted in FIG. 1 is able to compensate for the fall time of the gate line driver circuitry 5 without having to return the display system to its manufacturer for testing or calibration by using integrated circuitry (e.g., compensation unit 70).

The data line signals are provided by voltage sources $V_{data}$ that are found within data line driver circuitry 7. The data line driver circuitry 7, also called the source driver circuitry, receives control and digital pixel signals from decode and timing logic 8. The latter translates incoming digital video pixel values (for example, red, green and blue digital pixel values) into analog data signals with appropriate timing, that are driven onto the data lines. The data line driver 7 performs the needed voltage level shifting, for example, to produce a data line voltage having not just the needed fan out or current capability, but also the desired amplitude or signal swing with the appropriate gray level voltage.

The capacitor 4 may include a liquid crystal capacitor that is formed between a pixel plate electrode and a common plate or electrode, where the latter is, in this example, directly connected to a number of other pixels in the same column, by virtue of a common voltage line that runs vertically as shown (similar to the data lines). A further capacitor (not shown), referred to as a storage capacitor, may be added to the pixel electrode, to increase the analog storage at that node. Other circuit arrangements for a storage circuit at the pixel electrode are possible.

In FIG. 1, the pixels in column j are all connected to the same common voltage line that terminates at a common voltage generation source or circuit 11, which contains a variable voltage source that produces and maintains a voltage Vcom on the common voltage line. Thus, a first subset of pixels, in this example, are coupled to the common voltage line at Vcom and are a column of pixels, namely column j. Other pixel groupings for a common voltage generation circuit, such as a group consisting of one partial column and one partial row that intersects with that column, are possible. In that case, part of the common voltage line is said to run horizontally (similar to the gate lines).

Figure 2:
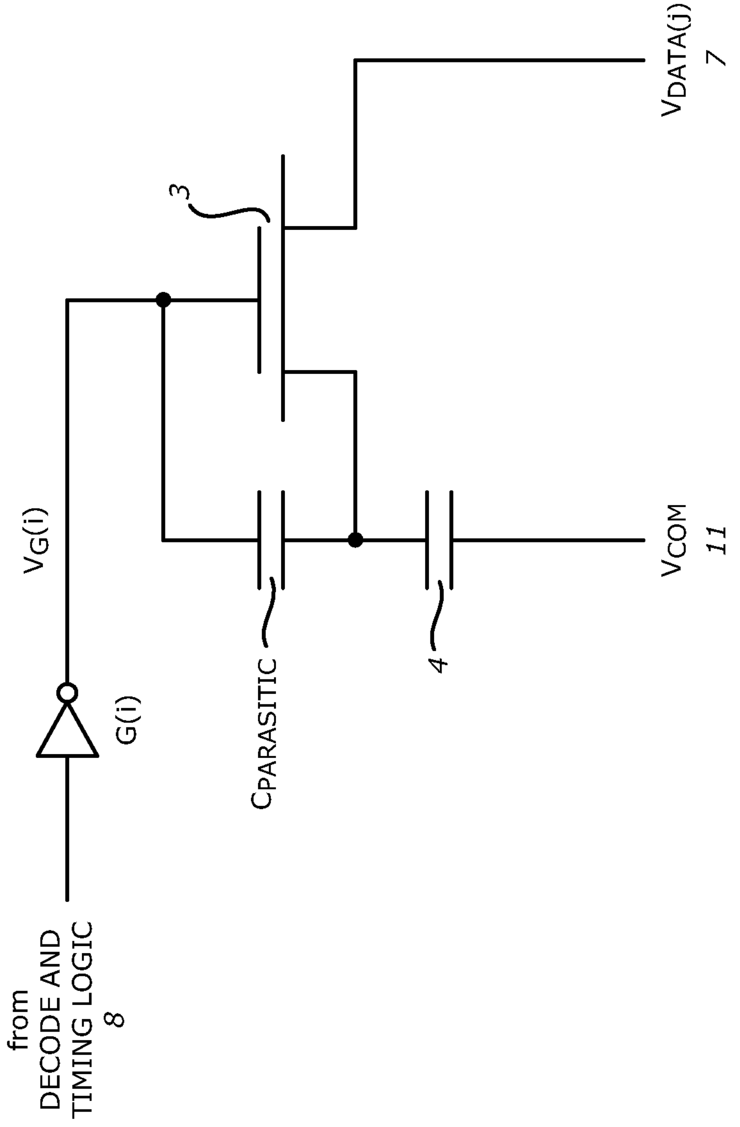
FIG. 2 shows the effect of coupling on the transistor due to the fall time of the gate driver.

Referring to FIG. 2, the effect of coupling on the transistor 3 due to the fall time of the gate driver G(i) is illustrated. This coupling may cause a slight bump in the voltage across the transistor 3 or cause a charge ejection from the transistor 3. As the gate signal decreases from $V_G$(i) to a set value in order to turn off the transistor 3, the fall time of the gate signal causes a coupling on the transistor 3. As shown in FIG. 2, the parasitic capacitor $C_{Parasitic}$ is formed across the transistor 3 which affects the voltage being stored in the capacitor 4 in the pixel. Thus, the data line voltage being stored in the capacitor in the pixel may be inaccurate because of this coupling.

Figure 3:
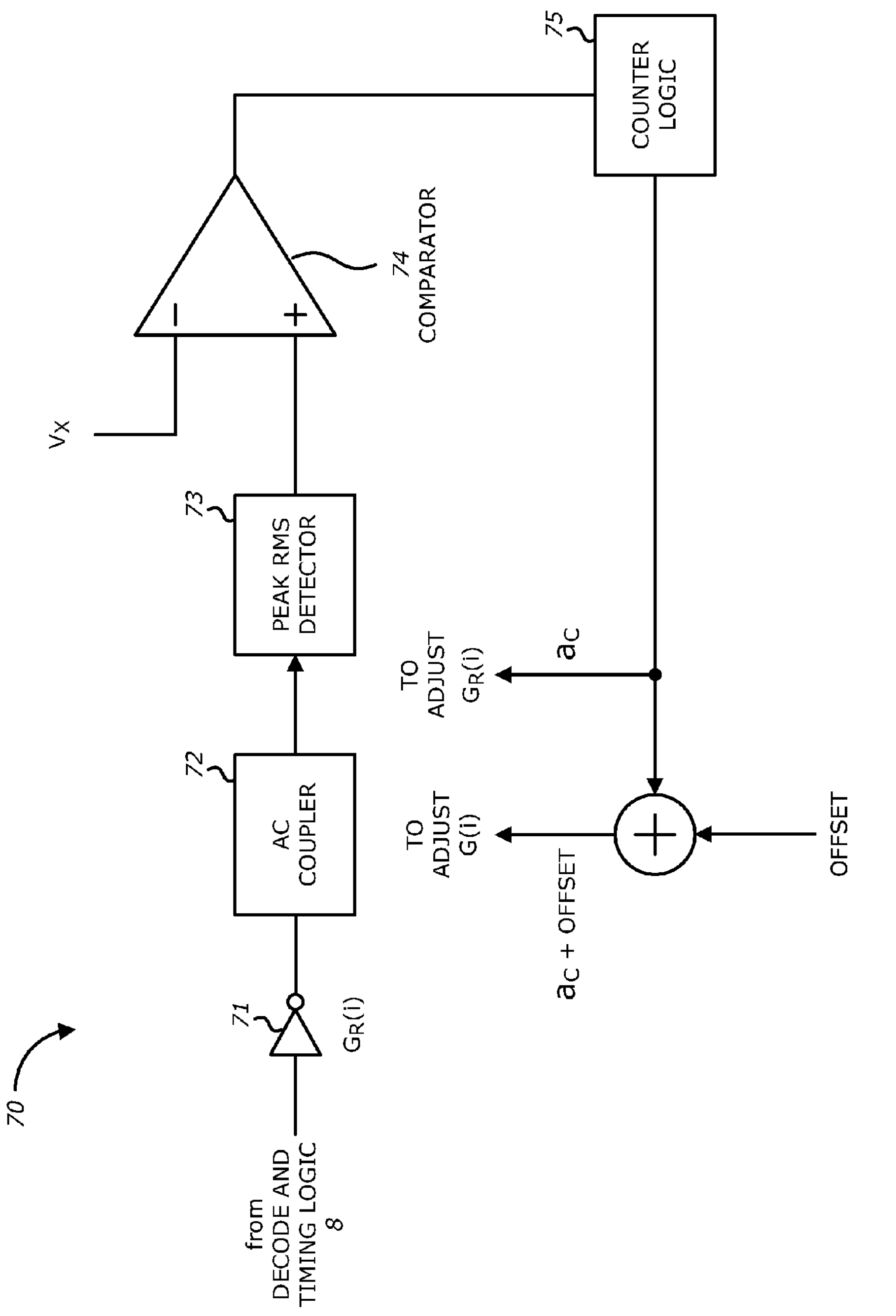
FIG. 3 is a combined circuit and block diagram of a fall time compensation circuit in accordance with one embodiment of the invention.

Turning now to FIG. 3, a combined circuit and block diagram of a fall time compensation unit 70 in accordance with one embodiment of the invention is shown. It is understood that the illustration in FIG. 3 of the compensation unit 70 is simplified to include only elements to compensate for the fall time exhibited by one of the gate drivers G(i) in the gate line driver circuitry 5 from FIG. 1. The compensation unit 70 may include a plurality of similar elements to compensate for the fall time of each of the gate drivers G(i), G(i+1), and G(i+2) (i>1).

As shown in FIG. 3, the compensation unit 70 includes a replica gate driver $G_R$(i) 71, an AC coupler 72, a peak RMS detector 73, an analog comparator 74, and a counter logic 75.

The replica gate driver $G_R$(i) 71 is a replica of the gate driver G(i) that is used to calculate the fall time being exhibited. The replica gate driver $G_R$(i) 71 receives the control signal from the decode and timing logic 8. Based on this control signal, the replica gate driver $G_R$(i) 71 generates a replica gate signal.

The AC coupler 72 may be connected between the replica gate driver $G_R$(i) 71 and the peak RMS detector 73 to perform AC coupling of the replica gate signal in order to block the DC signal component of the replica gate signal.

The peak RMS detector 73 receives the AC coupled replica gate signal and calculates a peak RMS (root mean square) of the signal. The peak RMS detector 73 outputs the peak RMS of the AC coupled replica gate signal ("peak RMS") which is a voltage level that may provide an indication of the fall time being exhibited by the replica gate signal. In one embodiment, the peak RMS detector 73 includes a resistor-capacitor (RC) circuit to RC filter the AC coupled replica gate signal.

As shown in FIG. 3, the analog comparator 74 has a pair of complimentary inputs that are coupled to sense (or compare) the output of the peak RMS detector 73 and a reference voltage $V_x$. The reference voltage $V_x$ may be an optimal voltage determined and hardwired in the factory to generate the optimal fall time for the gate driver. The output of the comparator 74 controls the direction of up/down counter logic 75 whose output count is a digital value that represents the difference between the peak RMS and the reference voltage $V_x$.

The up/down counter logic 75 may also be reset and clocked by decode and timing logic 8, and is designed to have a sufficient number of bits that can be used to adequately represent the expected range of analog voltage that represents the difference between the peak RMS and the reference voltage $V_x$.

The digital output count generated by the up/down counter logic 75 is a compensation value $a_c$ that may be used to adjust the gate driver G(i) and the replica gate driver $G_R$(i) to compensate for the fall time. This adjustment may be designed to decrease the fall time of the gate driver G(i) to the optimal fall time that is associated with the reference voltage $V_x$. This adjustment results in a more accurate voltage reading across the capacitor 4 in the pixel.

In one embodiment, the compensation value $a_c$ is used to adjust the replica gate driver $G_R$(i) while an offset value is added to the compensation value $a_c$ to generate an offset compensation value (i.e., offset+$a_c$) that is used to adjust the gate driver G(i). In other embodiments, the compensation unit 70 may also include a look-up table coupled to the output of the up/down counter logic 75 to receive the output count. The look-up table may include a plurality of actual fall times that are correspond respectively to a plurality of output counts. Thus, the look-up table may be used to obtain an actual fall time that is associated with the output count generated by the up/down counter logic 75. In this embodiment, the actual fall time obtained from the look-up table is the difference in fall time between the peak RMS and the reference voltage $V_x$. This actual fall time may then be used to adjust the gate driver G(i) and the replica gate driver $G_R$(i).

In some embodiments, the measurements by the compensation circuit 70 may be triggered by the decode and timing logic 8 through, for example, a command from a higher layer display system monitoring process or software/firmware (not shown) that may be executing in the consumer electronic device in which the display system has been integrated.

Figure 4A:
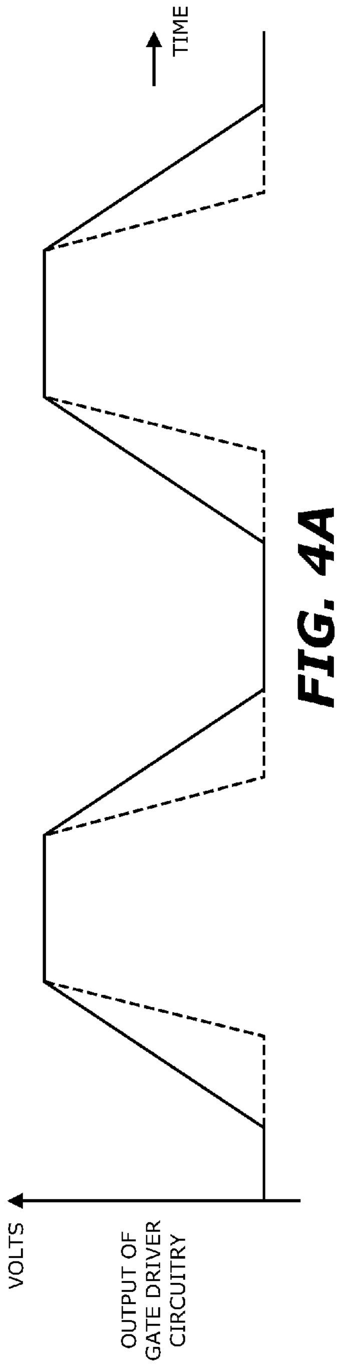
FIG. 4A shows example waveforms for a replica gate signal showing a long fall time and a short fall time and FIG. 4B shows corresponding example waveforms used by the peak RMS detector to calculate the peak RMS.
Figure 4B:
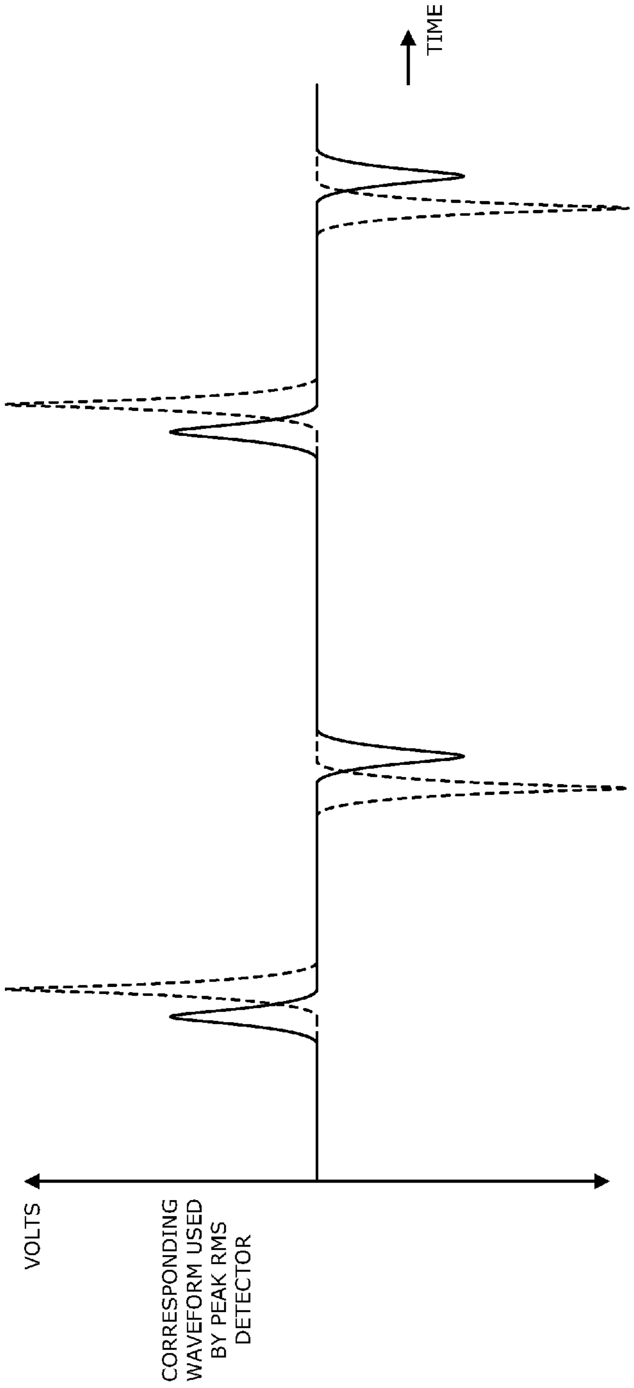

Referring now to FIG. 4A, example waveforms for a replica gate signal (and the gate line signal) that shows a long fall time (i.e., solid line) and a short fall time (i.e., dotted line) are illustrated. The waveforms in this figure represent the replica gate line voltage (and the gate line voltage) $V_G$(i). As the replica gate signals in FIG. 4A reach the peak RMS detector 73, the corresponding example waveforms used by the peak RMS detector 73 to calculate the peak RMS of the replica gate signal are illustrated in FIG. 4B. As shown in FIG. 4B, a larger voltage spike is exhibited when the replica gate signal has a short fall time (i.e., dotted line). Accordingly, the peak RMS of the signals illustrated in FIG. 4B will be different.

Figure 5:
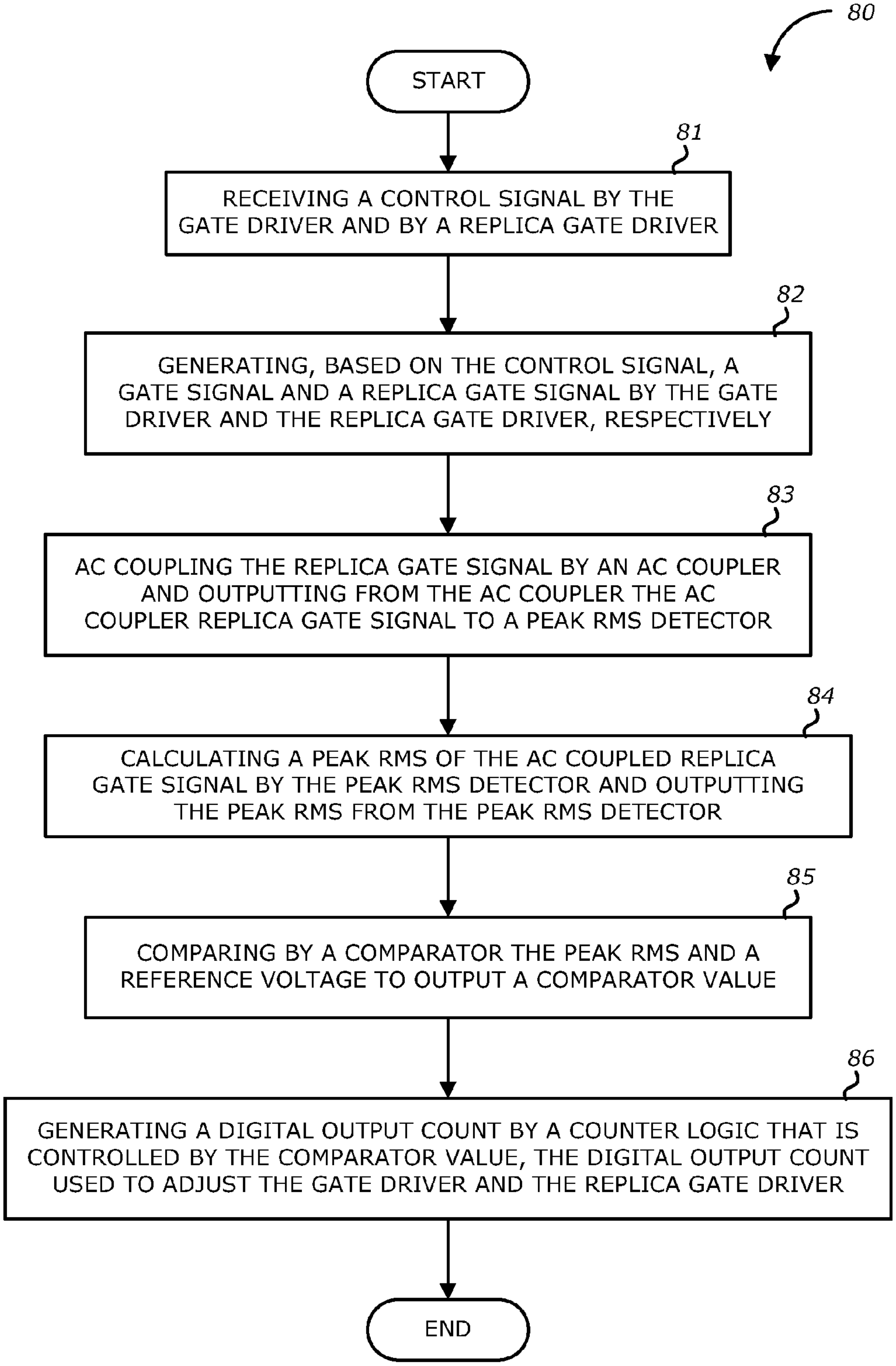
FIG. 5 is a flow diagram of an example process for configuring a display system to compensate for the fall time of the gate driver.

FIG. 5 is a flow diagram 80 of an example process for configuring a display system 1 to compensate for the fall time of the gate driver G(i). As illustrated in FIG. 1, the display system 1 includes a display panel having pixels, the gate driver G(i), and a compensation unit 70. The objective of the compensation unit 70 is to measure the fall time of the gate driver G(i) by using a replica of the gate driver G(i) (i.e., gate driver $G_R$(i)) and compensating for this fall time by adjusting the gate driver G(i) and the replica gate driver $G_R$(i) accordingly.

The method 80 may begin with the gate driver G(i) and the replica gate driver $G_R$(i) included in the compensation unit 70 both receiving a control signal from the decode and timing logic 8 (Block 81). Based on the control signal, the gate driver G(i) and the replica gate driver $G_R$(i) may respectively generate a gate signal and a replica gate signal (Block 82).

Next, the replica gate signal may be AC coupled by an AC coupler 72 that is included in the compensation unit 70 (Block 83). The AC coupler 72 may be used to block the DC signal component from the replica gate signal such that the AC coupler 72 outputs the AC coupled replica gate signal to a peak RMS detector 73. At Block 84, the peak RMS detector 73 which is also included in the compensation unit 70 calculates a peak RMS of the AC coupled replica gate signal and outputs the peak RMS. The peak RMS that is obtained is a voltage level that provides an indication of the fall time. Next, an analog comparator 74 compares the peak RMS and a reference voltage $V_x$ to sense the difference and output a comparator value (Block 85). At Block 86, a counter logic 75 that is controlled by the comparator value generates a digital output count which is used to adjust the gate driver G(i) and the replica gate driver $G_R(i)$. The digital output count may be a compensation value $a_c$ that represents the difference between the peak RMS of the replica gate signal and the reference voltage $V_x$. In one embodiment, the compensation value $a_c$ is used to adjust the replica gate driver $G_R(i)$ while an offset value is added to the compensation value $a_c$ to generate an offset compensation value (i.e., offset+$a_c$) that is used to adjust the gate driver G(i).

Figure 6:
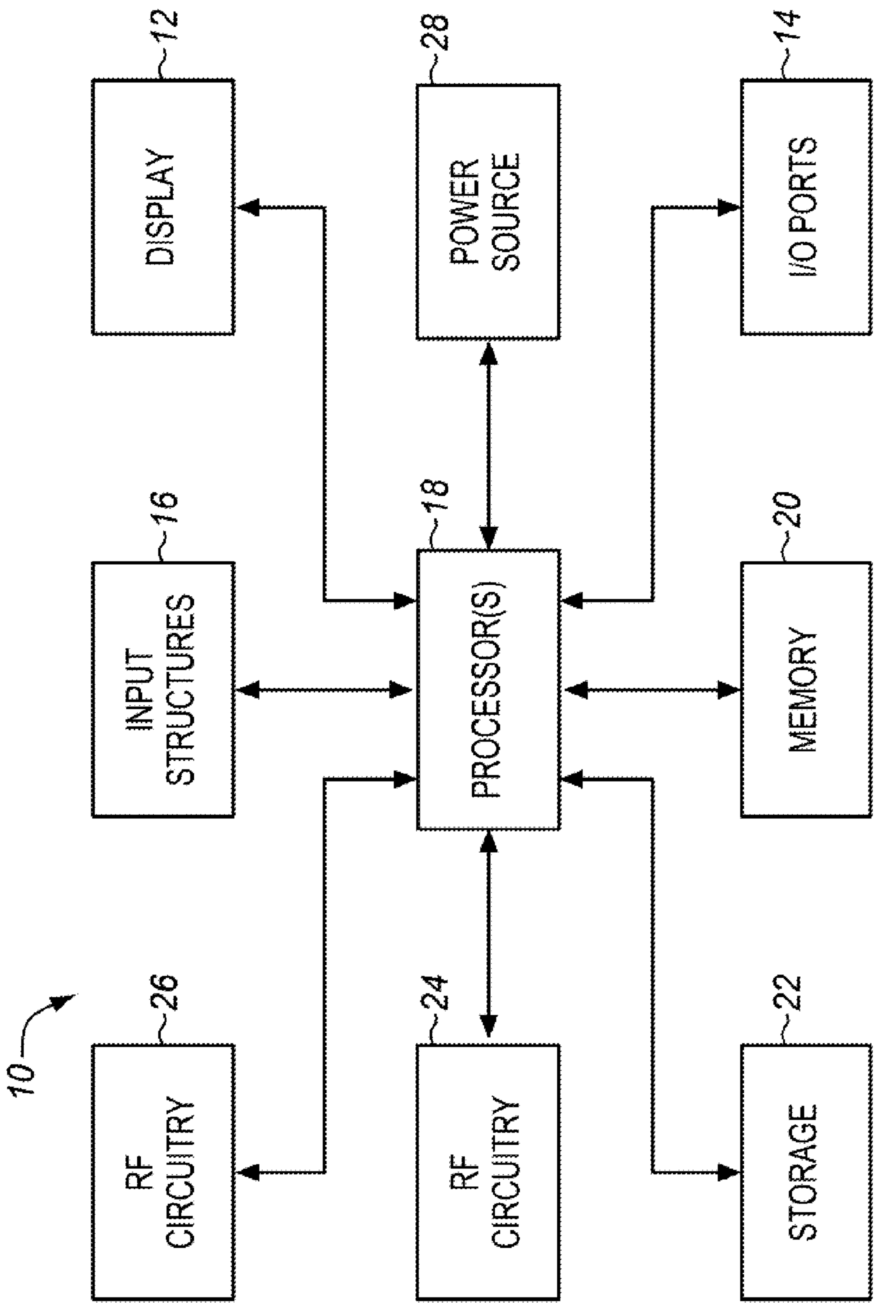
FIG. 6 is a block diagram of exemplary components of an electronic device that includes a display device, in accordance with aspects of the present disclosure.
Figure 7:
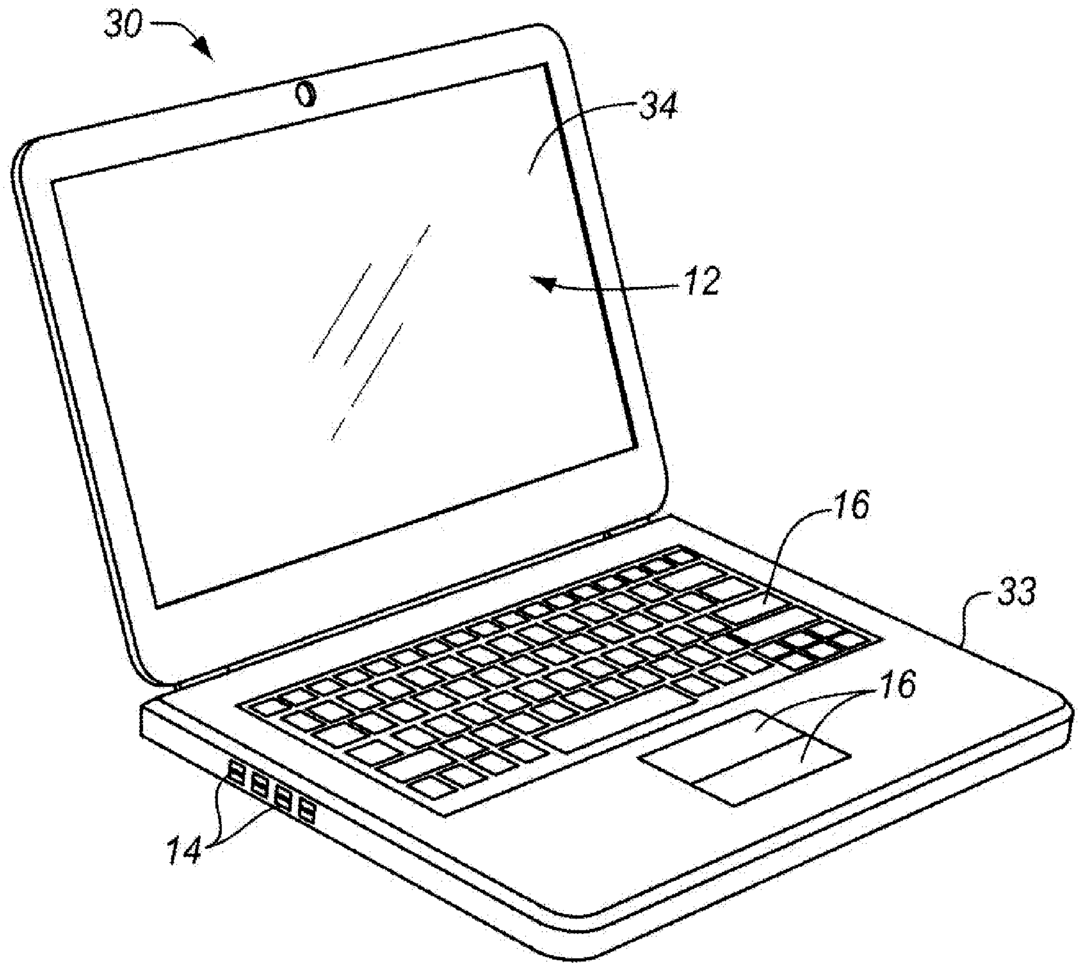
FIG. 7 is a perspective view of an electronic device in the form of a computer, in accordance with aspects of the present disclosure.
Figure 8:
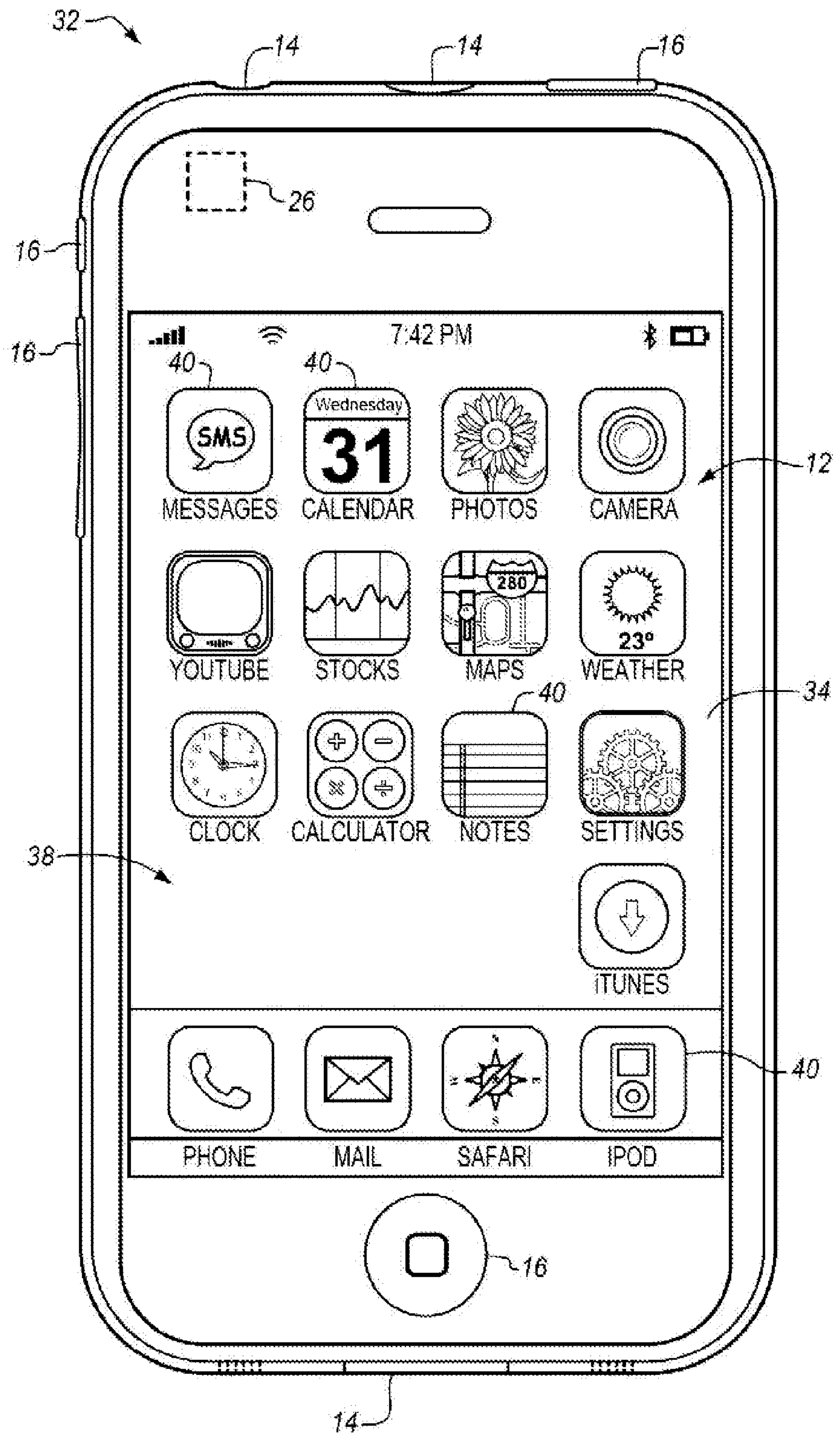
FIG. 8 is a front-view of a portable handheld electronic device, in accordance with aspects of the present disclosure.
Figure 9:
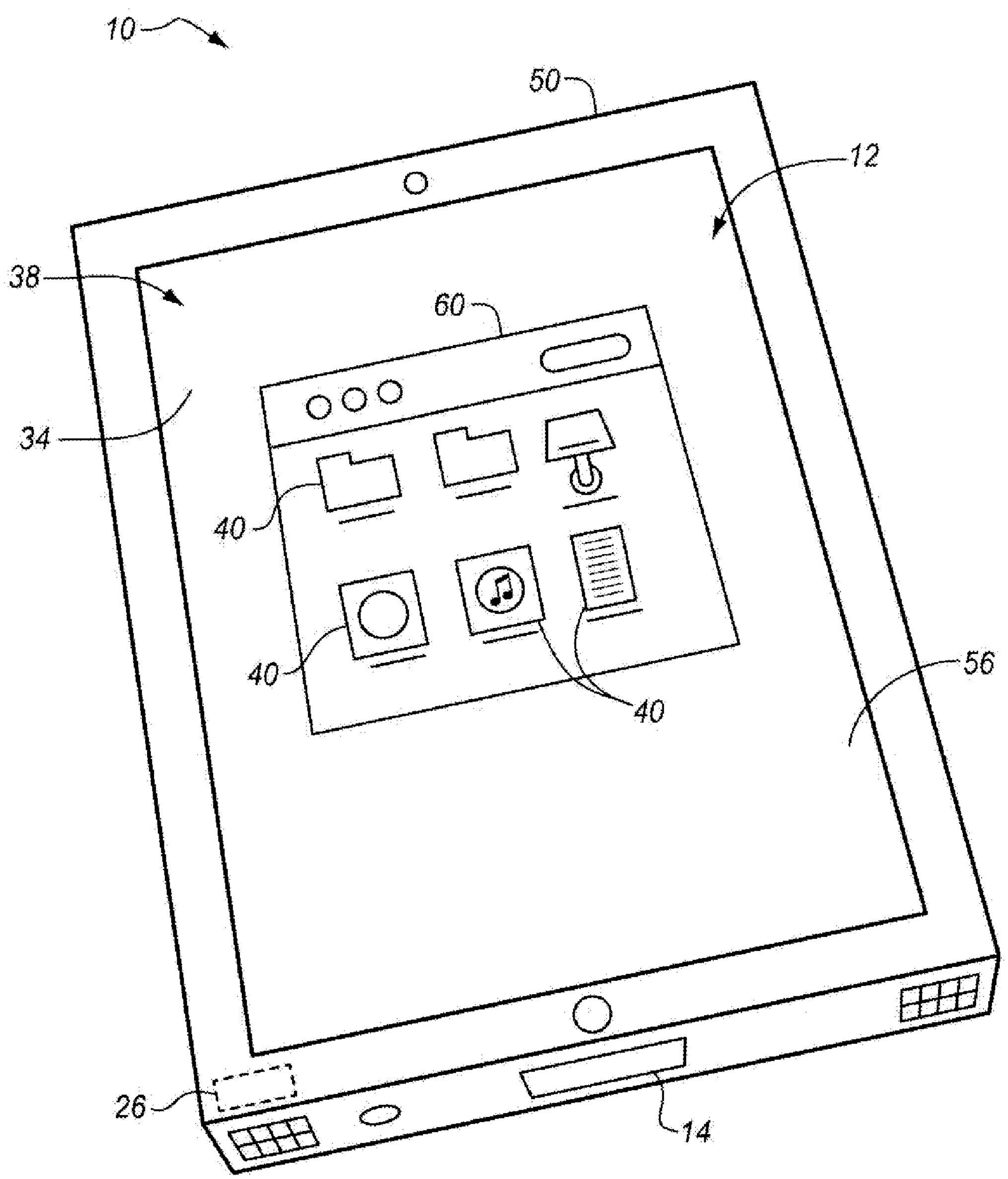
FIG. 9 is a perspective view of a tablet-style electronic device that may be used in conjunction with aspects of the present disclosure.

A general description of suitable electronic devices for performing these functions is provided below with respect to FIGS. 6-9. Specifically, FIG. 6 is a block diagram depicting various components that may be present in electronic devices suitable for use with the present techniques. FIG. 7 depicts an example of a suitable electronic device in the form of a computer. FIG. 8 depicts another example of a suitable electronic device in the form of a handheld portable electronic device. Additionally, FIG. 9 depicts yet another example of a suitable electronic device in the form of a computing device having a tablet-style form factor. These types of electronic devices, as well as other electronic devices providing comparable display capabilities, may be used in conjunction with the present techniques.

Keeping the above points in mind, FIG. 6 is a block diagram illustrating components that may be present in one such electronic device 10, and which may allow the device 10 to function in accordance with the techniques discussed herein. The various functional blocks shown in FIG. 6 may include hardware elements (including circuitry), software elements (including computer code stored on a computer-readable medium, such as a hard drive or system memory), or a combination of both hardware and software elements. It should be noted that FIG. 6 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28.

The display 12 may be used to display various images generated by the electronic device 10. The display may be any suitable display such as a liquid crystal display (LCD), a plasma display, or an organic light emitting diode (OLED) display, for example. In one embodiment, the display 12 may be an LCD employing fringe field switching (FFS), in-plane switching (IPS), or other techniques useful in operating such LCD devices. The display 12 may be a color display utilizing a plurality of color channels for generating color images. By way of example, the display 12 may utilize a red, green, and blue color channel. The display 12 may include gamma adjustment circuitry configured to convert digital levels (e.g., gray levels) into analog voltage data in accordance with a target gamma curve. By way of example, such conversion may be facilitated using a digital-to-analog converter, which may include one or more resistor strings, to produce "gamma-corrected" data voltages.

In certain embodiments, the display 12 may include an arrangement of unit pixels defining rows and columns that form an image viewable region of the display 12 as discussed above. A source driver circuit may output this voltage data to the display 12 by way of source lines defining each column of the display 12. Each unit pixel may include a thin film transistor (TFT) configured to switch a pixel electrode. A liquid crystal capacitor may be formed between the pixel electrode and a common electrode, which may be coupled to a common voltage line (Vcom). When activated, the TFT may store image signals received via a respective data or source line as a charge in the pixel electrode. The image signals stored by the pixel electrode may be used to generate an electrical field between the respective pixel electrode and a common electrode. Such an electrical field may align liquid crystal molecules within an adjacent liquid crystal layer to modulate light transmission through the liquid crystal layer.

FIG. 7 illustrates an embodiment of the electronic device 10 in the form of a computer 30. The computer 30 may include computers that are generally portable (such as laptop, notebook, tablet, and handheld computers), as well as computers that are generally used in one place (such as conventional desktop computers, workstations, and servers). In certain embodiments, the electronic device 10 in the form of a computer may be a model of a MacBook™, MacBook™ Pro, MacBook Air™, iMac™, Mac™ Mini, or Mac Pro™, available from Apple Inc. of Cupertino, Calif. The depicted computer 30 includes a housing or enclosure 33, the display 12 (e.g., as an LCD 34 or some other suitable display), I/O ports 14, and input structures 16.

The display 12 may be integrated with the computer 30 (e.g., such as the display of a laptop or all-in-one computer) or may be a standalone display that interfaces with the computer 30 using one of the I/O ports 14, such as via a DisplayPort, DVI, High-Definition Multimedia Interface (HDMI), or analog (D-sub) interface. For instance, in certain embodiments, such a standalone display 12 may be a model of an Apple Cinema Display™, available from Apple Inc. As will be discussed below, the display 12 may include two or more common voltage lines and may be configured to reduce and/or compensate for errors that may be present between the kickback voltage associated with each of the two or more common voltage lines, thereby reducing the appearance of visual artifacts and/or improving color accuracy.

The electronic device 10 may also take the form of other types of devices, such as mobile telephones, media players, personal data organizers, handheld game platforms, cameras, and/or combinations of such devices. For instance, as generally depicted in FIG. 8, the device 10 may be provided in the form of a handheld electronic device 32 that includes various functionalities (such as the ability to take pictures, make telephone calls, access the Internet, communicate via email, record audio and/or video, listen to music, play games, connect to wireless networks, and so forth). By way of example, the handheld device 32 may be a model of an iPod™, iPod™ Touch, or iPhone™ available from Apple Inc.

In the depicted embodiment, the handheld device 32 includes the display 12, which may be in the form of an LCD 34. The LCD 34 may display various images generated by the handheld device 32, such as a graphical user interface (GUI) 38 having one or more icons 40.

In another embodiment, the electronic device 10 may also be provided in the form of a portable multi-function tablet computing device 50, as depicted in FIG. 9. In certain embodiments, the tablet computing device 50 may provide the functionality of media player, a web browser, a cellular phone, a gaming platform, a personal data organizer, and so forth. By way of example, the tablet computing device 50 may be a model of an iPad™ tablet computer, available from Apple Inc.

The tablet device 50 includes the display 12 in the form of an LCD 34 that may be used to display a GUI 38. The GUI 38 may include graphical elements that represent applications and functions of the tablet device 50. For instance, the GUI 38 may include various layers, windows 60, screens, templates, or other graphical elements 40 that may be displayed in all, or a portion, of the display 12. As shown in FIG. 9, the LCD 34 may include a touch-sensing system 56 (e.g., a touchscreen) that allows a user to interact with the tablet device 50 and the GUI 38. By way of example only, the operating system GUI 38 displayed in FIG. 4 may be from a version of the Mac OS™ or iOS™ (e.g., OS X) operating system, available from Apple Inc.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the discussion above refers to a single transistor (being a TFT) as the switch element of a pixel, the discussion is also applicable to the case where the switch element is a different active device or has a more complex circuit structure (e.g., more than transistor). The description is thus to be regarded as illustrative instead of limiting.

What is claimed is:

1. A display system comprising:
- a display panel including a pixel, wherein the pixel includes a capacitor and a transistor;
- a gate driver that receives a control signal and that, based on the control signal, generates a gate signal to drive the transistor in the pixel; and
- a compensation unit coupled to the gate driver to compensate for a fall time of the gate driver, the compensation unit including:
  - a replica gate driver that receives the control signal and that, based on the control signal, generates a replica gate signal,
  - an AC coupler coupled to the replica gate driver to perform AC coupling on the replica gate signal,
  - a peak root mean square (RMS) detector coupled to the AC coupler to calculate a peak RMS of the AC coupled replica gate signal and to output a peak RMS,
  - a comparator coupled to the peak RMS detector to compare the peak RMS and a reference voltage and output a comparator value, and
  - a counter controlled by the comparator value to generate a compensation value used to adjust the gate driver and the replica gate driver.

2. The display system in claim 1, wherein the pixel comprises a plurality of pixels and the gate driver comprises a plurality of gate drivers.

3. The display system in claim 1, wherein the reference voltage is an optimal voltage to generate an optimal fall time for the gate driver.

4. The display system of claim 1, wherein the peak RMS detector comprises a resistor-capacitor (RC) circuit to RC filter the AC coupled replica gate signal.

5. The display system of claim 1, wherein the comparator is an analog comparator.

6. The display system of claim 1, wherein the counter is an up/down counter logic.

7. The display system of claim 6, wherein the counter outputs a digital output count value that represents the difference between the peak RMS and the reference voltage.

8. The display system of claim 6, the comparator value controls the direction of the up/down counter logic.

9. The display system of claim 1, the compensation unit further comprising:
- a look-up table coupled to the counter, the look-up table including a plurality of actual fall times corresponding to a plurality of output counts, respectively, wherein the plurality of output counts include the digital output count value,
- wherein one of the plurality of actual fall times corresponding to the digital count value is read from the look-up table and is used by the compensation unit to adjust the gate driver and the replica gate driver.

10. The display system of claim 1, wherein the compensation value adds an offset value to the compensation value to obtain an offset compensation value that is used to adjust the gate driver.

11. A method of compensating a fall time of a gate driver in a display system, the display system including a display panel, the gate driver, and a compensation unit, the method comprising:
- receiving a control signal by the gate driver and by a replica gate driver included in the compensation unit;
- generating, based on the control signal, a gate signal and a replica gate signal by the gate driver and the replica gate driver, respectively;
- AC coupling the replica gate signal by an AC coupler included in the compensation unit and outputting from the AC coupler the AC coupled replica gate signal to a peak RMS detector included in the compensation unit;
- calculating a peak RMS of the AC coupled replica gate signal by the peak RMS detector and outputting the peak RMS from the peak RMS detector;
- comparing by a comparator the peak RMS and a reference voltage to output a comparator value; and
- generating a digital output count by a counter logic that is controlled by the comparator value, the digital output count being a compensation value that is used to adjust the gate driver and the replica gate driver.

12. The method in claim 11, wherein the gate driver generates a gate signal to drive a transistor included a pixel of a display panel.

13. The method in claim 11, wherein the reference voltage is an optimal voltage to generate an optimal fall time for the gate driver.

14. The method of claim 11, wherein calculating the peak RMS of the AC coupled replica gate signal by the peak RMS detector comprises RC filtering the AC coupled replica gate signal using a resistor-capacitor (RC) circuit included in the peak RMS detector.

15. The method of claim 11, wherein the comparator is an analog comparator.

16. The method of claim 11, wherein the counter logic is an up/down counter logic.

17. The method of claim 16, wherein the digital output count represents the difference between the peak RMS and the reference voltage.

18. The method of claim 16, the comparator value controls the direction of the up/down counter logic.

19. The method of claim 11, further comprising:
- reading a first actual fall time corresponding to the digital count value from a look-up table, the look-up table including a plurality of actual fall times corresponding to a plurality of output counts, respectively, wherein the plurality of output counts include the digital output count value and the plurality of actual fall times including the first actual fall time; and adjusting the gate driver and the replica gate driver using the first actual fall time.

20. The method of claim 11, further comprising:

adding an offset value to the compensation value to obtain an offset compensation value; and adjusting the gate driving using the offset compensation value.

* * * * *